United States Patent [19]

O'Malley et al.

[11] Patent Number: 4,634,816
[45] Date of Patent: Jan. 6, 1987

[54] COMMUNICATIONS HEADSET

[75] Inventors: Kieran O'Malley, Louisburgh; John Preisler, Riverside; Berni Larkin, Callan, all of Ireland

[73] Assignee: Northern Telecom Limited, Montreal, Canada

[21] Appl. No.: 713,930

[22] Filed: Mar. 20, 1985

[30] Foreign Application Priority Data

May 21, 1984 [GB] United Kingdom ................. 8412899

[51] Int. Cl.⁴ ............................................. H04M 1/05
[52] U.S. Cl. ...................................... 379/430; 2/209; 387/183; 387/187
[58] Field of Search ........... 179/156 A, 156 R, 182 R, 179/182 A; 2/209, 209.1

[56] References Cited

U.S. PATENT DOCUMENTS

| | | | |
|---|---|---|---|
| 1,650,865 | 11/1927 | Edwards | 179/156 R |
| 2,434,251 | 1/1948 | Warnke | 179/156 R |
| 3,735,021 | 5/1973 | Bonis et al. | 179/156 A |

FOREIGN PATENT DOCUMENTS

| | | | |
|---|---|---|---|
| 229836 | 3/1925 | United Kingdom | 179/156 R |
| 1177925 | 1/1970 | United Kingdom | 179/156 A |

OTHER PUBLICATIONS

*Telephony* Ad, Dec. 4, 1972, vol. 183, No. 23, p. 23.

Primary Examiner—Gene Z. Rubinson
Assistant Examiner—Danita R. Byrd
Attorney, Agent, or Firm—Sidney T. Jelly

[57] ABSTRACT

A communications headset has two earpieces mounted on a headband, one at each end. The earpieces are mounted on the headband by arcuate members or stirrups which provide for pivoting of the earpieces about an axis in the plane of the headband, or parallel thereto. A boom attachment member is rotatably mounted on the back of one of the earpieces and the boom is mounted on the attachment member for pivotal and swinging movement. A receiver can be in both earpieces or only in the earpiece carrying the boom. The boom carries an electret microphone and associated amplifier.

10 Claims, 11 Drawing Figures

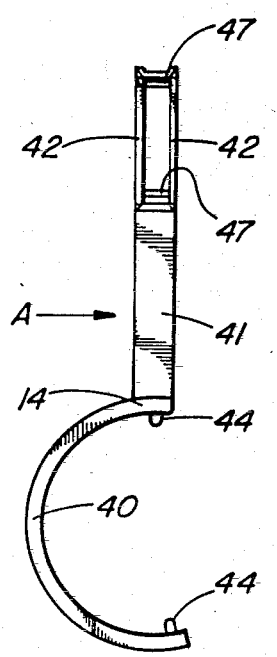
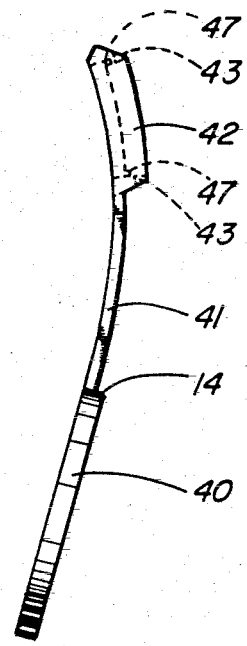
FIG. 4  FIG. 5
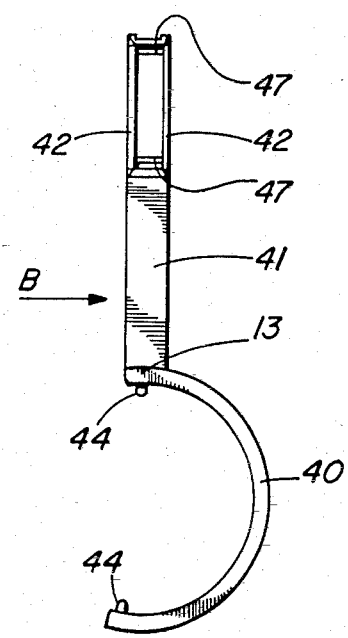
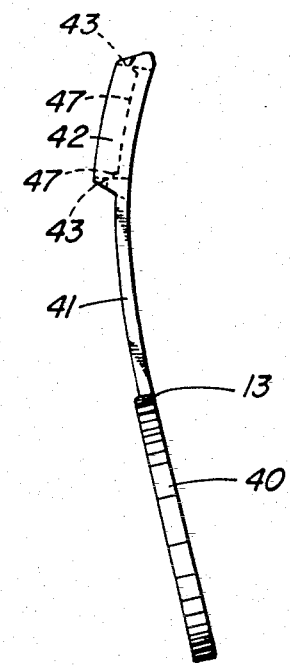
FIG. 6  FIG. 7

COMMUNICATIONS HEADSET

BACKGROUND OF THE INVENTION

This invention relates to a headset as used by telephonists, radio operators and other persons for receiving and sending information and other signal. In particular the invention provides a headset which can be worn in different orientations and is also capable of being used in a manner similar to a telephone handset when not worn as a headset.

SUMMARY OF THE INVENTION

The headset of the present invention has two earpieces mounted on a flexible headband, an earpiece at each end of the band. The mounting of the earpieces permits movement along the band for positional adjustment. The earpiece mounting comprises an arcuate member extending laterally from the plane of the headband, in the form of a stirrup, with pivot members adjacent each end of the stirrup. The earpiece is mounted on the pivot members to pivot about an axis generally in the plane of the headband or parallel to that plane, being capable of pivoting for about 120° for the earpiece with a boom and about 150° for the other earpiece. A boom extends from one earpiece, having a pivotal mounting which provides for slightly less than 360° rotation of the boom on the earpiece. At the free end of the boom is an electret microphone and an amplifier. One or both earpieces can contain a receiver.

The mounting of an earpiece enables pivoting of the earpiece such that it can be held against an ear, without the headband being on the users head. The pivotal attachment of the boom permits positioning of the headband over the head, behind the neck of the user, or in front of the neck.

BRIEF DESCRIPTION OF THE DRAWING

The invention will be readily understood by the following description of one embodiment in conjunction with the accompanying drawings, in which:

FIG. 4 is a front view of a stirrup for one earpiece;

FIG. 5 is a view in the direction of arrow A in FIG. 4;

FIG. 6 is a front view of the stirrup for the other earpiece;

FIG. 7 is a view in the direction of arrow B in FIG. 6;

DESCRIPTION OF THE PREFERRED EMBODIMENTS

Figure 1:
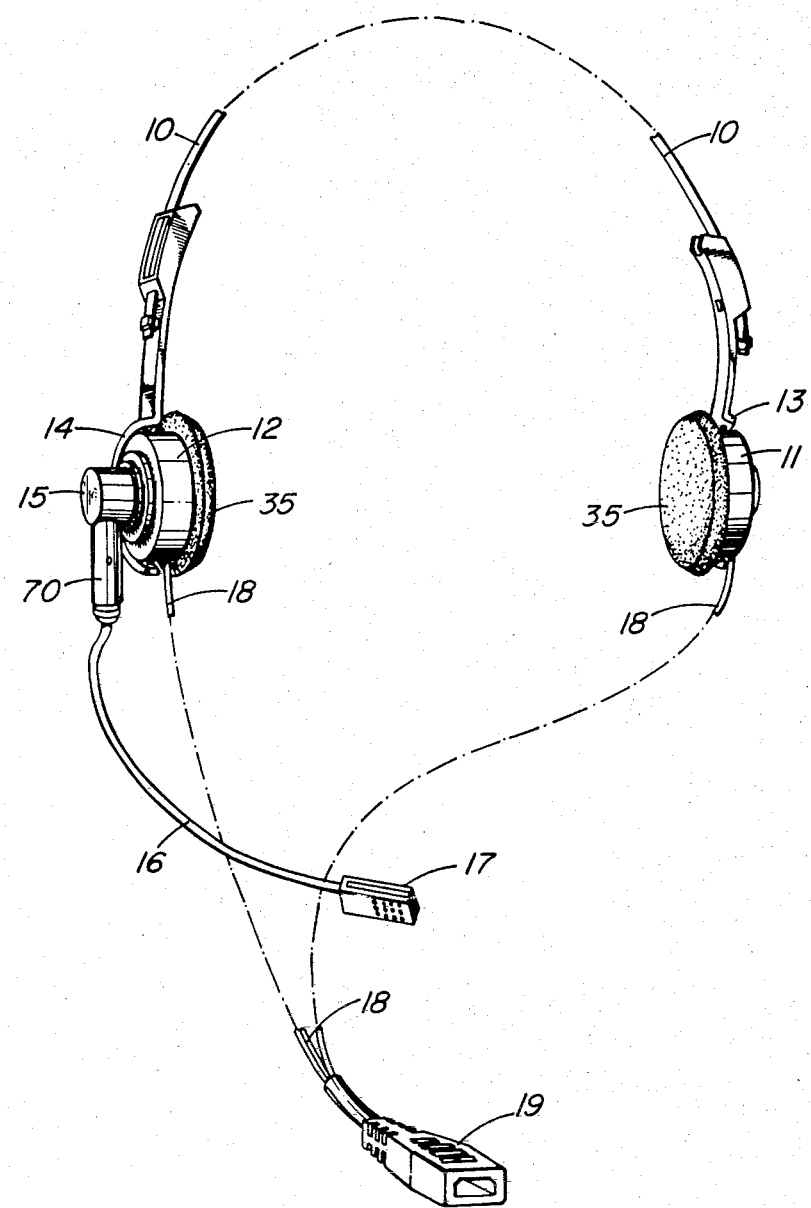
FIG. 1 is a perspective view of a headset in accordance with the invention.

Considering FIG. 1, there is illustrated a headset having a flexible headband 10, with earpiece assemblies 11 and 12 mounted at each end of the headband, by means of arcuate members or stirrups 13 and 14 respectively. An attachment member 15 is pivotally mounted on the rear surface of earpiece assembly 12 and a boom 16 is mounted on the attachment member 15. At the free end of the boom 16 is a housing 17 in which is positioned an electret transmitter and amplifier. In the example, both earpiece assemblies have receivers mounted in them, and conductors 18 extend from the receivers to a jack 19.

Figure 2:
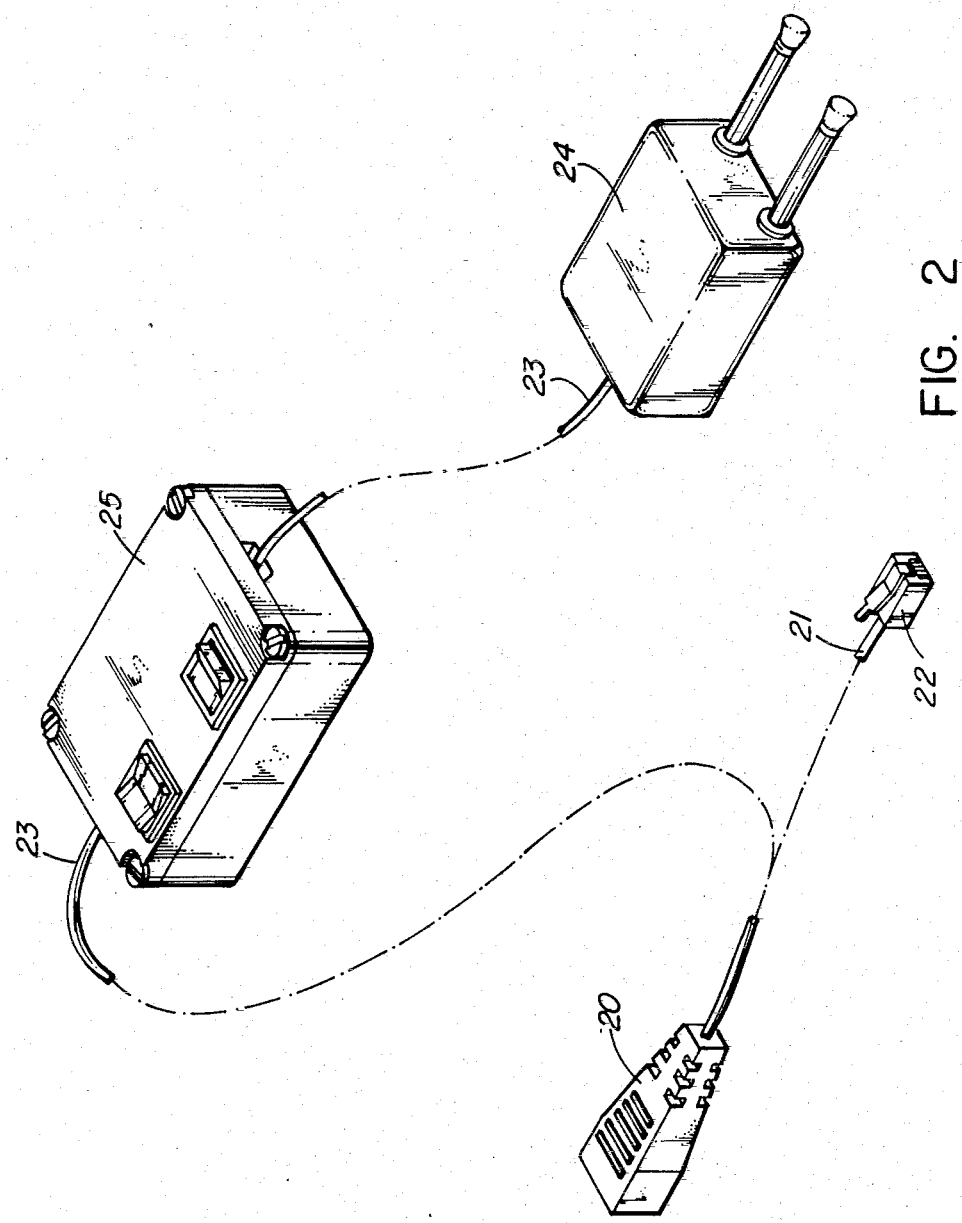
FIG. 2 is a perspective illustration of two alternative connecting means for connecting the headset to a telephone or other system.

The headset can be connected to a modular jack outlet by means of a suitable connecting cord or it can be connected to a terminal via an alternative connecting cord. This is illustrated in FIG. 2, there being a plug 20 which connects to jack 19 of the headset, the plug either on a cord 21 having a modular plug 22, or a cord 23 having a two pin plug 24. In the cord 23 there is provided a switch assembly 25.

Figure 3:
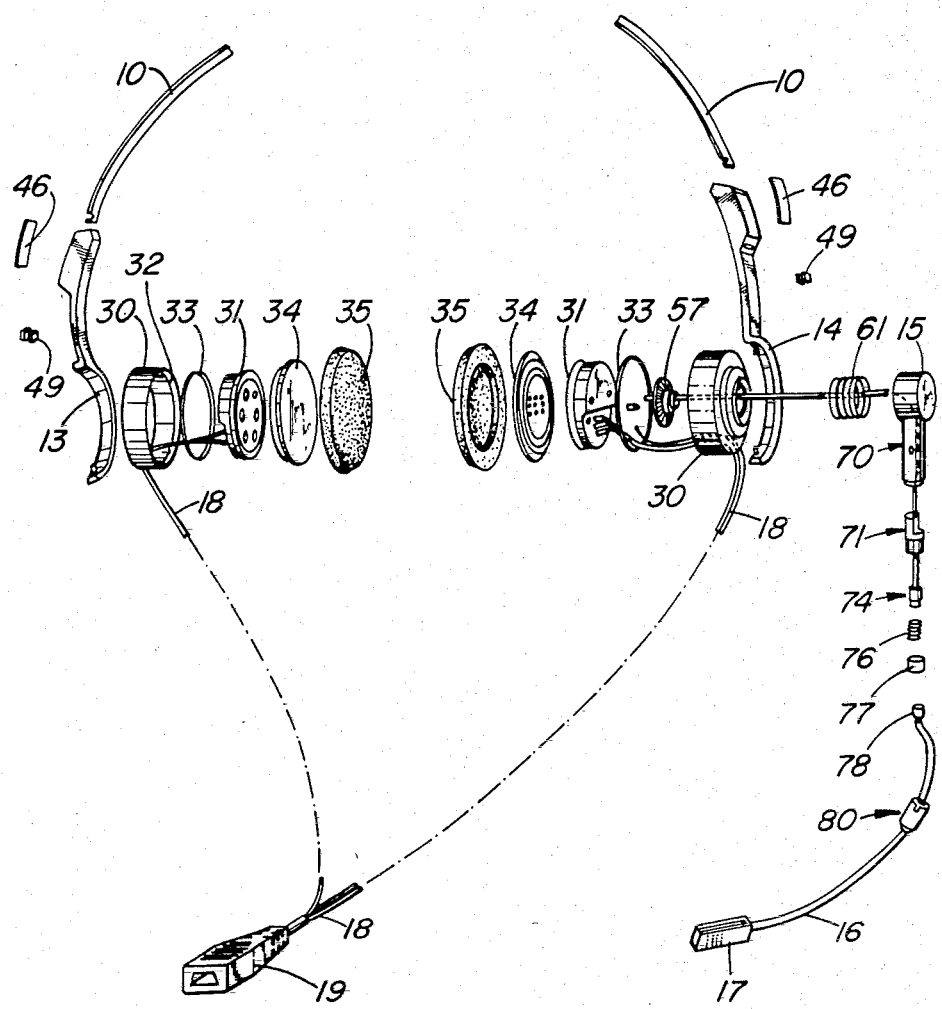
FIG. 3 is an exploded perspective view of the headset of FIG. 1.

FIG. 3 illustrates the headset in a exploded form. In particular, the earpiece assemblies are illustrated in more detail and also the attachment of the boom 16 to the attachment member 15. The pivotal mounting of the attachment member is also shown. Each earpiece assembly, 11 and 12 of FIG. 1, comprises a hollow housing 30 within which is mounted a receiver 31, the housing being open at the front and closed at the back. The receiver 31 rests on a ledge 32 in the housing 30, a gasket 33 being positioned between the receiver and the ledge. A receiver cap 34 fits over the front of the housing and the receiver and retains the receiver in the housing. A foam pad 35 fits on the cap 34 for comfort of the user, and to provide improved coupling between the earpiece assembly and the ear of the user. The mounting of the attachment member 15 is illustrated in more detail in FIG. 9, which is described later. Similarly the mounting of the boom 16 to the attachment member 15 is illustrated in more detail in FIG. 10, also described later.

FIGS. 4 to 7 illustrate the two arcuate members or stirrups 13 and 14. FIGS. 4 and 5 illustrate stirrup 14, which comprises an arcuate member 40 from one end of which extends an arm 41. The arm is slightly curved, following generally the curve of the headband 10. At the end of the arm remote from the arcuate member 40 is a channel shaped section formed by two substantially parallel webs 42 extending from a base which is essentially an extension of the arm. At the corners of the webs 42 remote from the base are formed transverse ribs 43. The headband passes between the webs 42, between ribs 43 and the base. Two pivot members 44 are provided on the arcuate member. The top pivot member is aligned with the arm 41, and the bottom pivot member is positioned slightly past the axis through the upper pivot member and arm, for example about 9°. The inside diameter of the arcuate member is normally slightly less, for example 1 millimeter, than the outer diameter of the housing 30. When the housing is mounted, by inserting the pivot members 44 into recesses in the housing, the jaws of the stirrup compress about the housing, preventing movement of the housing along the axis of the pivot members and also ensuring that the housing, and thus the earpiece assembly, does not swivel too freely. The curving of the arm 41 aligns the earpiece assembly to the users face to ensure maximum coupling of the signal from the receiver.

The stirrup 13, illustrated in FIGS. 6 and 7, is substantially the same as the stirrup 14, the only difference being that it is of opposite hand. The same reference numerals are used for the said items in FIGS. 4 to 7.

Figure 8:
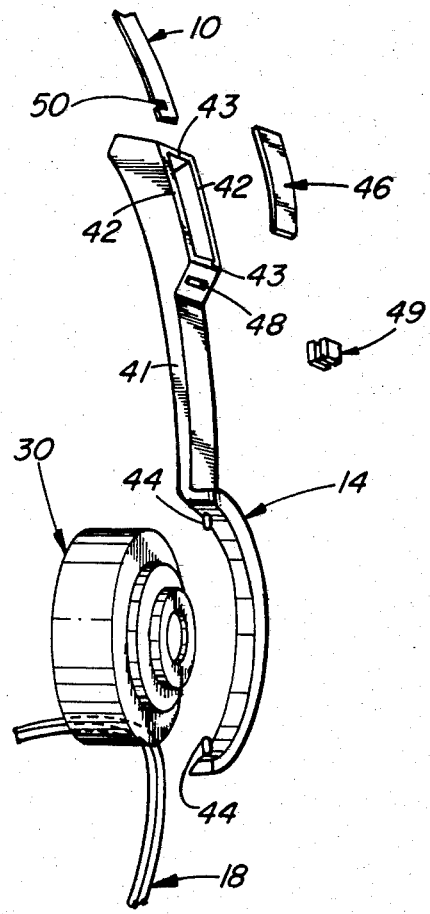
FIG. 8 illustrates the attachment of a stirrup to the headband and the mounting of an earpiece on the stirrup.

FIG. 8 illustrates the attachment of a stirrup to the headband and the mounting of the housing of an earpiece assembly to the stirrup. A leaf spring 46 is inserted between the flanges 42, the spring being located between two buttresses on the base, these buttresses being shown at 47 in FIGS. 4 to 7. The transverse ribs 43 define slots 48 at each end of the channel shaped section and the headband 10 passes through the slots 48, depressing the spring 46. A stop member 49 is attached to each end of the headband, at 50, to prevent complete removal of the headband. This arrangement is conventional. The pivot members 44 engage in recesses or holes in the housing 30 and provide a pivotal axis which is generally in the plane of the headband, or parallel thereto.

Figure 9:
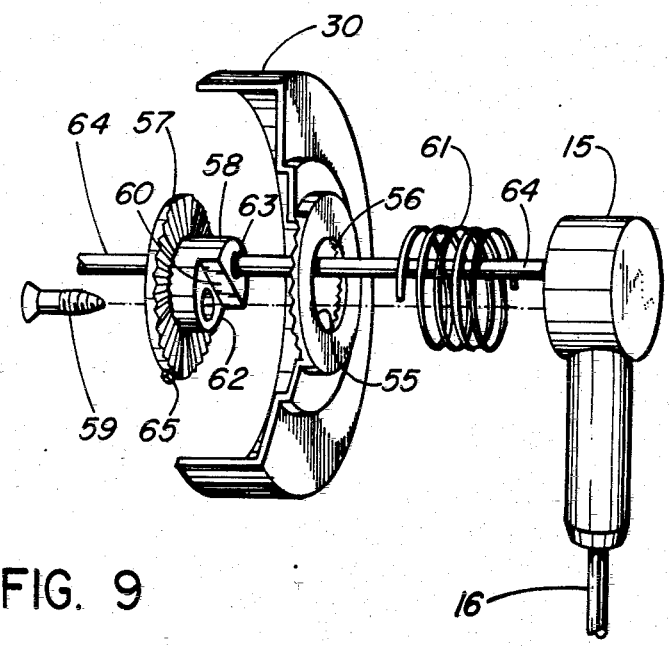
FIG. 9 is an exploded perspective view of the mounting of the boom attachment number on an earpiece.

FIG. 9 illustrates the mounting of the attachment member 15 to the housing 30 of an earpiece assembly. The back of the housing 30 has a central circular aperture 55, with the inner surface of the back having an annular radially serrated or grooved track 56. A rachet member 57, having a serrated or grooved surface to match the track 56, has a central circular boss 58 which projects through and is a close rotational fit in the central aperture 55 and extends into the attachment member 15, being attached to the attachment member by a screw 59. The boss 58 has a segment removed, at 60, which matches a similar formation in the attachment member so that the attachment member and rachet member rotate together as a single unit. A light compression spring 61 is positioned between the attachment member and the outer surface of the housing 30, and around the boss 58, being compressed on tightening of the screw 59. The spring 61 provides some resilience, or relative axial movement between boss 58 and attachment member 15, to permit rotation of the boom 16 and attachment member 15 by rotation of the rachet member over the track 56. The compression of the spring is such as to allow movement of the boom 16 only when a torque is applied but not to require excessive effort. The conductor to the transmitter is fed from the boom, through the attachment member through the spring 61, boss 58 to the transmitter. Conveniently, the hole for the screw 59, indicated at 62, is offset in the boss 58, and a further offset hole 63 is provided for the conductor, indicated at 64.

A protrusion 65 on the periphery of the rachet member engages with a protrusion on the inner surface of the housing to limit the rotation of the rachet member, attachment member and boom to about 330° to avoid conductor breakage. The approximate 30° dead zone is positioned so as to not impede headset use or the packing of the headset with the boom generally in the same plane as, or parallel to the plane, of the headband.

Figure 10:
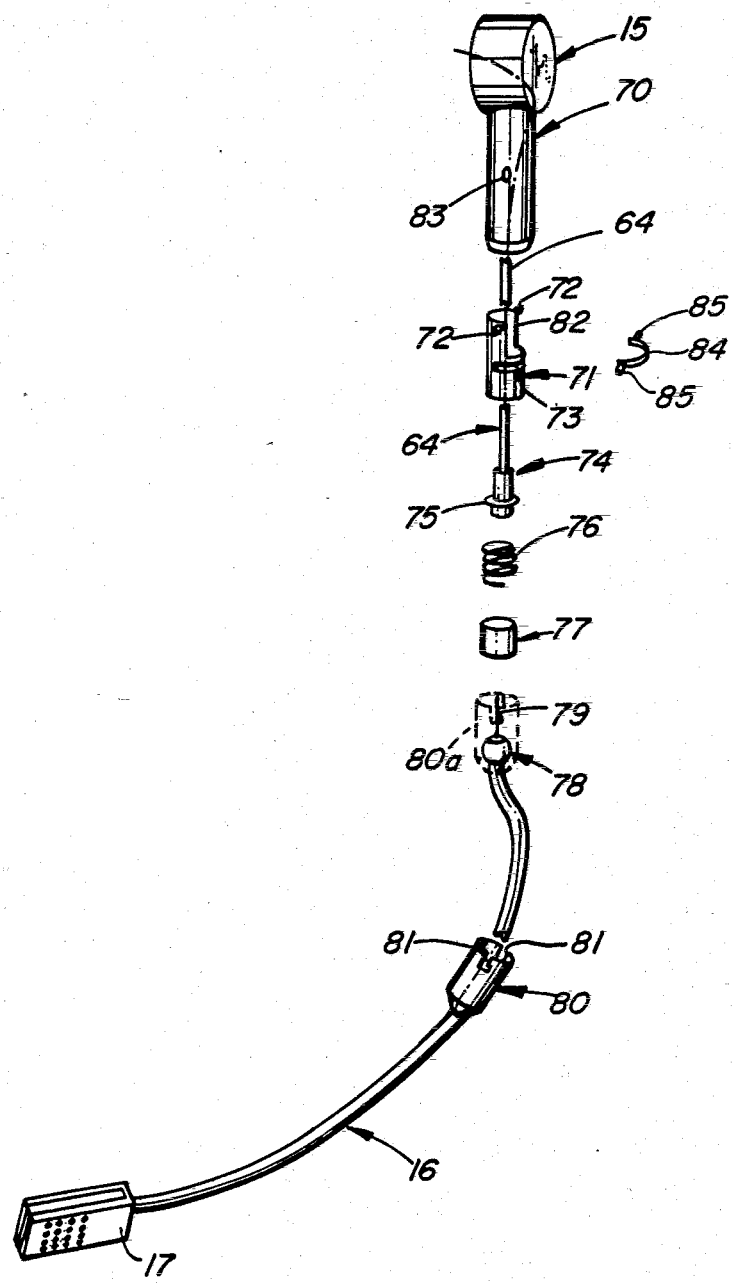
FIG. 10 is an exploded perspective view of the mounting of the boom to the boom attachment member.

FIG. 10 illustrates the pivotal attachment of the boom 16 to the attachment member 15. The attachment member 15 has a radially extending hollow arm 70. A tubular member 71 has two pins 72 extending outward radially at an inner end and has a slot or groove 73 adjacent the outer end. Positioned in the slot 73 is an arcuate member 84 having a radially extending pin 85 at each end. The conductor 64 passes through the tubular member and is terminated in a tubular contact member 74. The contact member 74 has a circumferentially extending rib 75 towards its outer end and a compression spring 76 fits over the outer end of the contact member 74, resting against the rib 75. A sleeve 77 fits around the spring 76. The inner end of the boom 16 has a ball formation 78 through which extends the end of a conductor, indicated at 79, from the transmitter/amplifier assembly at 17. Slidable on the boom 16 is a cup shaped member 80. The cup shaped member slides up the boom enclosing the ball formation 78, as indicated in dotted outline at 80a. The sleeve 77 also fits inside the cup shaped member 80, plus the spring 76 and the contact member 74. The cup shaped member slides over the tubular member 71 and can be attached to the tubular member by L shaped slots 81 at the inner end of the cup shaped member which engage with the pins 85. The cup shaped member 80 is attached to the tubular member 71 by compressing the spring 76, obtaining contact between the outer end of the contact member 74 an the ball formation 78. The conductor 79 passes up into an inner bore in the contact member to which the conductor 64 is connected. The conductor 64 has two wires. One wire is connected to the inner bore into which the conductor 79 enters. The other wire makes contact via the outer part of the tubular member the spring 76, sleeve 77 to the ball formation 78 which connects to the outer wall of the boom. The boom forms a coaxial conductor.

The cup shaped member is attached to the tubular member 71 and then the whole assembly pushed up into the hollow arm 70. This is achieved by the flexing of the pins 72 and the wall of the tubular member 71. This is facilitated by removing part of the wall of the tubular member, as indicated at 82. Alternately the wall of the tubular member could be slit down from its inner end to form fingers to which the pins 72 are attached. The tubular member assembly is pushed into the arm 70 until the pins snap into two holes 83 in the arm 70. The boom is now secured to the attachment member 15, with only a winding movement of the boom on its ball-socket joint.

A sufficient portion of the cup shaped member 80 extends from the tubular member 71 to allow it to be pushed in and rotated to disengage the slots 81 from the pins 85 and thus allow the boom to be removed. The whole assembly of cup shaped member 71 can be removed from the arm 70 by use of a tool which presses the pins 72 inwards to clear the holes 83. The inner surface of the outer end of the cup shaped member 80 and the outer end surface of the sleeve 77 are given a concave arcuate form to make a fit with the ball formation 78. Pivotal joints generally of this form are described and illustrated in Canadian Pat. No. 917,275, issued Dec. 19th, 1972, particularly in FIG. 2.

Figure 11:
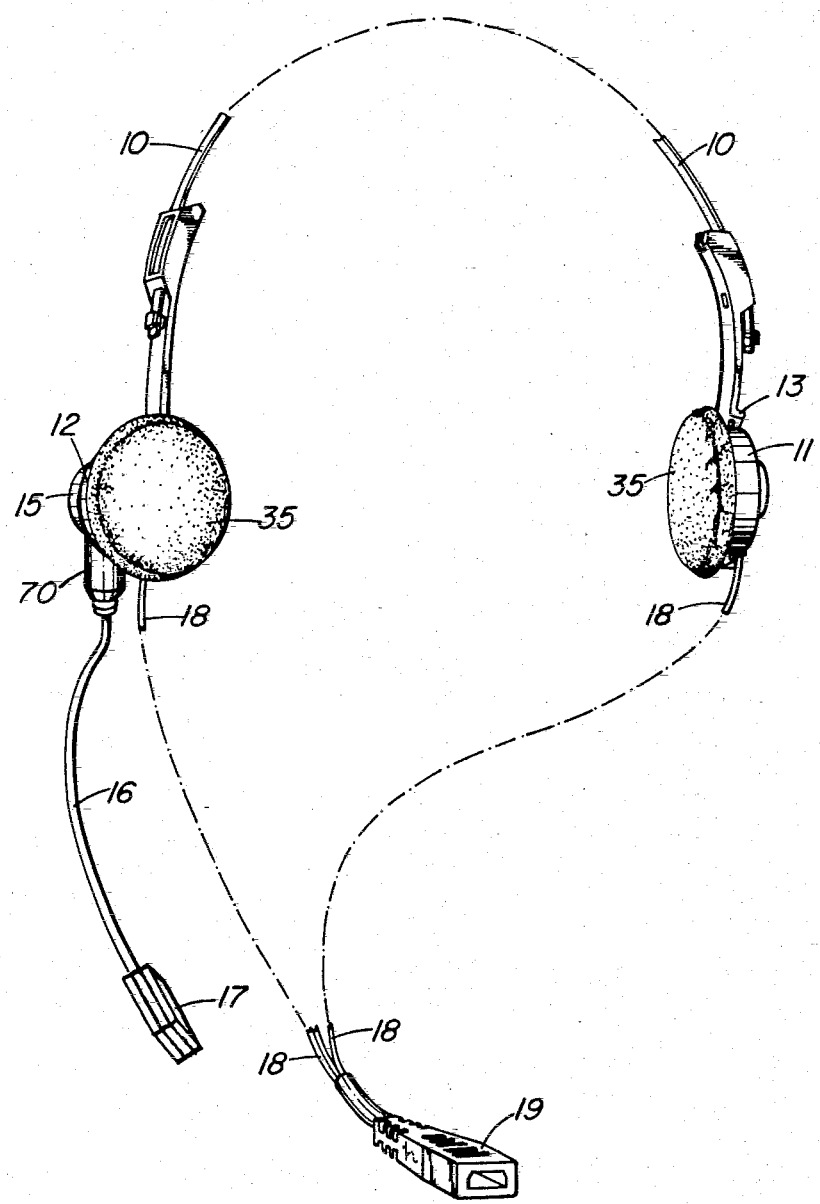
FIG. 11 is a view similar to that of FIG. 1, but with the earpiece and boom assembly pivoted to provide hand-held use.

FIG. 11 illustrates the headset, as in FIG. 1, with earpiece assembly 12, together with the boom 16, pivoted in its stirrup so that the earpiece assembly can be held in a hand and positioned against an ear without the headband being over the users head. The transmitter housing 17 will be correctly positioned close to the users mouth and the headset can be used in the same manner as a conventional handset. This is obtained by the particular orientation of the pivot axis.

As stated, with the use of a cord which has a modular plug at its end, as in FIG. 2 at 22, the headset can be plugged into a conventional telephone set, of the electronic type. By changing the cord to one with a plug suitable for attachment to a terminal, as in FIG. 2 at 24, connection to various other forms of terminal is possible. For some uses it may not be necessary, or required, that two receivers be provided. In this instance, the receiver 31 in the housing 30 mounted in stirrup 13, the left housing in FIG. 3, can be omitted along with the associated conductors.

The boom can be rotated about an axis through the ball formation 78, and the contact member 74. The boom can also be moved laterally in any direction to a limited degree. This permits the positioning of the boom on either side of the head of the user. The pivotal mounting of the attachment member 15 permits of alternate positioning of the headband, over the head, behind the neck or in front of the neck, or intermediate.

The electret transmitter and amplifier assembly mounted in the housing 17, in the particular example, comprises a noise cancelling electret transmitter together with, for example, an FET amplifier. The assembly is suitable for consoles, telephone sets and other terminals adapted for either carbon or electronic transmitters, by the use of alternative plugs and in-line housings. Conventionally, headsets are suitable only for consuls adapted to carbon transmitters.

The initial cord from the headset is normally fairly short with the jack 19 normally resting on the chest of the user. A clip for attaching to clothing can be provided. Alternate forms of connecting lead can then be attached depending on use.

What is claimed is:

1. A communication headset comprising an arcuate flexible headband extending in a plane; an arcuate member attached to each end of said headband, each arcuate member extending in a plane normal to said plane of said headband, each arcuate member extending in the same direction relative to said headband; a pivot member at each end of each arcute member, said pivot members of an arcuate member defining a pivotal axis parallel to said plane of said headband; an earpiece pivotally mounted in each arcuate member on said pivot members, the earpieces pivotal abut said pivotal axis parallel to said plane of said headband; an attachment member rotatably mounted on a back surface of one of said earpieces, the rotational axis of said attachment member being normal to the pivotal axis of the earpiece; a microphone boom attached at one end to said attachment member for rotational and swinging movement; an electret transmitter attached to the other end of said boom; a receiver in at least the earpiece havig the attachment member mounted thereon; and an electrical cord connection to the receiver and to the transmitter.

2. A headset and claimed in claim 1, including a receiver in each earpiece.

3. A headset as claimed in claim 1, each earpiece being slideably mounted on the headband for movement along the headband.

4. A head set as claimed in claim 3 including an arm extending from one end of each arcuate member, the arm being slideably mounted on the headband.

5. A headset as claimed in claim 1, each earpiece having a hollow housing, the pivot members engaging with the housing.

6. A headset as claimed in claim 1, the earpiece having the attachment member mounted thereon including a rachet member within the housing and cooperating with a back surface of the housing, a boss on the rachet member passing through an aperture in the back of the housing and into the attachment member, a compression spring positioned around the boss between the attachment member and the back of the housing, the attachment member being attached to the rachet member.

7. A headset as claimed in claim 1, including a hollow arm extending from the attachment member, said hollow arm including means mounting the boom for rotational and swinging movement.

8. A headset as claimed in claim 1, including means for restricting rotation of the attachment member on the earpiece to not more than 330°.

9. A headset as claimed in claim 1 wherein the earpiece having the attachment member mounted thereon has a pivotal movement of about 120°.

10. A headset as claimed in claim 9, the other earpiece having a pivotal movement of about 150°.

* * * * *